United States Patent
Legagneux et al.

(10) Patent No.: US 8,035,295 B2
(45) Date of Patent: Oct. 11, 2011

(54) FIELD-EMISSION CATHODE, WITH OPTICAL CONTROL

(75) Inventors: Pierre Legagneux, Le Mesnil Saint Denis (FR); Laurent Gangloff, Gif Sur Yvette (FR); Eric Minoux, Orsay (FR); Jean-Philippe Schnell, Paris (FR); Frederic Andre, Clamart (FR); Dominique Dieumegard, Mareil Marly (FR)

(73) Assignee: Thales (FR)

( * ) Notice: Subject to any disclaimer, the term of this patent is extended or adjusted under 35 U.S.C. 154(b) by 326 days.

(21) Appl. No.: 11/721,970

(22) PCT Filed: Dec. 12, 2005

(86) PCT No.: PCT/EP2005/056701
§ 371 (c)(1), (2), (4) Date: Jun. 15, 2007

(87) PCT Pub. No.: WO2006/063982
PCT Pub. Date: Jun. 22, 2006

(65) Prior Publication Data
US 2009/0261727 A1    Oct. 22, 2009

(30) Foreign Application Priority Data
Dec. 15, 2004 (FR) ...................................... 04 13340

(51) Int. Cl.
*H01J 1/62* (2006.01)
*H01J 40/16* (2006.01)
*H01J 40/00* (2006.01)
(52) U.S. Cl. .......................... 313/498; 313/531; 313/537
(58) Field of Classification Search ............... 313/537, 313/542
See application file for complete search history.

(56) References Cited

U.S. PATENT DOCUMENTS

| | | | |
|---|---|---|---|
| 3,814,968 A * | 6/1974 | Nathanson et al. ............ | 313/542 |
| 3,911,423 A * | 10/1975 | Arndt et al. .................... | 345/44 |
| 4,540,452 A | 9/1985 | Croset et al. | |
| 4,741,817 A | 5/1988 | Croset et al. | |
| 5,053,833 A | 10/1991 | Pribat et al. | |
| 5,090,932 A | 2/1992 | Dieumegard et al. | |
| 5,106,480 A | 4/1992 | Croset et al. | |
| 5,262,348 A | 11/1993 | Pribat et al. | |

(Continued)

OTHER PUBLICATIONS

U.S. Application No. 297 081, filed Aug. 27, 1981, Michel Croset et al. (Abandoned).

(Continued)

*Primary Examiner* — Toan Ton
*Assistant Examiner* — Britt Hanley
(74) *Attorney, Agent, or Firm* — Lowe Hauptman Ham & Berner, LLP

(57) ABSTRACT

The invention relates to an optically-controlled field-emission cathode, comprising a substrate (10, 20, 30, 40, 50, 60, 70, 80, 90, 100) having at least one conducting surface (11, 21, 31, 41, 51, 61, 71, 81, 91, 101) and at least one conducting emitter element (16, 26, 36, 46, 56, 66, 76, 86, 96, 106) in the vicinity of a conducting surface, characterized in that it also comprises at least one photoconducting element (13, 23, 33, 43, 53, 63, 73, 83, 93, 103) electrically connected in series between at least one emitter element and a conducting surface of the substrate. Another subject of the invention is an amplifier tube comprising such a cathode. The application is for Vacuum tubes, in particular for microwave amplification, with a view for example to applications in telecommunications.

23 Claims, 9 Drawing Sheets

U.S. PATENT DOCUMENTS

| | | | |
|---|---|---|---|
| 5,304,815 A * | 4/1994 | Suzuki et al. | 257/10 |
| 5,314,569 A | 5/1994 | Pribat et al. | |
| 5,356,510 A | 10/1994 | Pribat et al. | |
| 5,397,735 A | 3/1995 | Mercandalli et al. | |
| 5,581,146 A | 12/1996 | Pribat et al. | |
| 5,656,525 A * | 8/1997 | Lin et al. | 216/11 |
| 5,804,833 A * | 9/1998 | Stettner et al. | 257/10 |
| 6,356,028 B1 | 3/2002 | Legagneux et al. | |
| 6,476,408 B1 | 11/2002 | Legagneux et al. | |
| 6,522,080 B1 | 2/2003 | Faillon et al. | |
| 6,570,445 B1 | 5/2003 | Perrin et al. | |
| 6,908,355 B2 * | 6/2005 | Habib et al. | 445/50 |
| 6,987,027 B2 * | 1/2006 | Jin | 438/20 |
| 7,005,789 B2 * | 2/2006 | Cattelino et al. | 313/442 |
| 7,214,553 B2 | 5/2007 | Legagneux et al. | |
| 7,491,269 B2 | 2/2009 | Legagneux et al. | |

OTHER PUBLICATIONS

U.S. Application No. 649 970, filed Sep. 12, 1984, Michel Croset et al. (Abandoned).

U.S. Application No. 143,264, filed Jun. 1, 1988, Michel Croset et al. (Abandoned).

U.S. Application No. 821 210, filed Jan. 23, 1986, Michel Croset et al. (Abandoned).

U.S. Application No. 407 054, filed Sep. 14, 1989, Michel Croset et al. (Abandoned).

U.S. Application No. 318 800, filed Nov. 6, 1981, Jean-Philippe Schnell et al. (Abandoned).

U.S. Application No. 545 958, filed Oct. 17, 1983, Dominique Dieumegard et al. (Abandoned).

U.S. Application No. 334 380, filed Jun. 24, 1988, Dominique Dieumegard et al. (Abandoned).

U.S. Application No. 299 444, filed Jan. 23, 1989, Didier Pribat et al. (Abandoned).

U.S. Application No. 450 399, filed Dec. 14, 1989, Henri Rajbenbach et al. (Abandoned).

U.S. Appl. No. 07/815,850, filed Dec. 31, 1991, Henri Rajbenbach et al. (Abandoned).

U.S. Appl. No. 07/645,241, filed Jan. 24, 1991, Didier Pribat et al. (Abandoned).

U.S. Appl. No. 07/791,182, filed Nov. 13, 1991, Dominique Broussoux et al. (Abandoned).

U.S. Appl. No. 07/788,420, filed Nov. 6, 1991, Dominique Broussoux et al. (Abandoned).

U.S. Appl. No. 07/910,071, filed Apr. 7, 1993, Didier Pribat, (Abandoned).

U.S. Appl. No. 08/059,219, filed May 10, 1993, Didier Pribat et al. (Abandoned).

C. Jacoboni, C. Canali, G. Ottaviani and A. A. Quaranta, "A Review of Some Charge Transport Properties of Silicon", Solid State Electorn, 20, 77 (1977).

P. Smith, M. Inoue and J. Frey, "Electron Velocity in Si and GaAs at Very High Electric Fields", Appl. Phys. Lett., 37, 797, (1980).

* cited by examiner

FIELD-EMISSION CATHODE, WITH OPTICAL CONTROL

CROSS-REFERENCE TO RELATED APPLICATIONS

The present application is based on International Application No. PCT/EP2005/056701, filed on Dec. 12, 2005, which in turn corresponds to French Application No. 04 13340 filed on Dec. 15, 2004 and priority is hereby claimed under 35 USC §119 based on these applications. Each of these applications are hereby incorporated by reference in their entirety into the present application.

FIELD OF THE INVENTION

The field of application is that of field-emission cathodes which can be used in vacuum tubes, in particular for microwave amplification, with a view for example to applications in telecommunications. It relates notably to tubes with direct modulation of the emission, such as triodes or tubes with inductive output.

BACKGROUND OF THE INVENTION

Currently, the electron sources of microwave amplifier tubes are thermionic. But sources functioning on the principle of field emissions (cold cathodes) are being studied for their potentially better performance (modulation of the emission at higher frequency, immediate starting of the cathode without heating delay, compactness of the tubes, etc.). The majority of these cathodes are made up of a conducting plane surface provided with relief structures, that are also conducting and onto which the electric field is concentrated. These relief structures are electron emitters when the field at their apex is sufficiently high. These cathodes are thus purely electrically controlled: in triodes, for example, which comprise three successive electrodes, the cathode, the grid and the anode, the electrical voltage applied between the cathode and the grid is modulated in order to modulate the electron current emitted by field emission from the cathode Several limitations result from this electrical control of the emission:
1/ The cathode surface area must be reduced to dimensions significantly smaller than the wavelength of the microwave signal, so that all the points on the cathode surface emit in phase, and therefore the modulation depth of the total emitted current is not attenuated. However, the smaller the surface area, the lower the emitted current and the more the output power is limited.
2/ Furthermore, the need for the cathode to be biased with a high negative voltage with respect to the extraction grid imposes the presence of a galvanic insulation between the cathode and the outer conductor of the input coaxial guide which is grounded. This galvanic insulation can limit the performance at high power.
3/ Moreover, in microwave tube technology, the microwave is coupled with the input cavity of the tube by a connector that is difficult to miniaturize. This is a limitation on the miniaturization of the whole cavity, and consequently, a limitation on the optimum operation.
4/ Also, the bandwidth (in particular, the maximum frequency of operation of the cathode) is limited owing to the fact that the input signal is applied to an input impedance with a significant capacitive component.

SUMMARY OF THE INVENTION

In order to solve these various problems, the invention proposes that the electrical modulation control be replaced by an optical control.

The present invention thus provides a cathode associating, in a generic manner, at least one emitter of electrons by field emission with a photoelectric (whose electrical properties may be modified by light) element (device or material), notably a photoconducting element (whose electrical conducting properties may be modified by light), in such a manner that this makes it possible to control the emission of the electrons using an optical source.

More precisely, a subject of the invention is an optically-controlled field-emission cathode, comprising a substrate having at least one conducting surface and at least one conducting emitter element in the vicinity of a conducting surface, characterized in that it also comprises at least one photoconducting element electrically connected in series between at least one emitter element and a conducting surface of the substrate.

Advantageously, the emitter element or elements, the photoconducting element or elements and the conducting surface or surfaces of the substrate are layered in this order within an integrated structure on the substrate.

According to one variant of the invention, the emitters can be of substantially conical or pyramidal shape with a base smaller than or equal to the height, made of semiconductor or metal.

Advantageously, the emitters can be of nanowire or nanofiber or nanotube type with a height greater than the diameter, made of carbon or of boron nitride or of metal.

The photoconducting elements can have conducting layers on their upper face.

According to one variant of the invention, the conducting layer or layers on the upper face of the photoconducting elements can be divided up into regions that are isolated from one another, each region is associated with an emitter, and the lateral dimensions of each region are smaller than, or of a similar size to, the height of the emitter.

According to one variant of the invention, the photoconducting element can be a photoresistor that can also operate as a photosource of current.

According to one variant of the invention, the photoconducting element can be a photodiode of PIN type, P being representative of a layer of p+-doped semiconductor material, I being representative of a layer of undoped, or very lightly doped, semiconductor material, and N being representative of a layer of n+-doped semiconductor material, or of MIN type, M being representative of a layer with metallic conduction, the layers P or M being in electrical contact with a conducting surface of the substrate in such a manner that the photodiode is reverse-biased during normal operation of the cathode.

The substrate can have conducting surfaces made of metal or transparent conductor or highly-doped semiconductor, or may itself be entirely formed from these materials.

According to one advantageous variant, the photoconducting element can be a semiconductor material I, very lightly doped or undoped in its central part and with heavy n or p doping at its ends (and, if required, a metallic layer at its upper end) so as to provide a good ohmic contact with the conductors to which it is connected as is known in the prior art, and operating, as will be explained later, in carrier mobility mode, corresponding to an optically controlled resistor.

According to one variant, the photoconducting element can also be an arrangement similar to the previous one with dimensions that allow it to operate in carrier speed saturation mode and therefore corresponding to an optically-controlled current source.

According to another variant, the photoconducting element can be of the PIN, MIN or MIP diode type being reverse-biased when the cathode is in operation and thus operating as a photodiode in a known manner (here, M denotes a metal, a compound of conducting oxides, etc.).

According to one advantageous variant, the upper conducting layer of the photoconducting element is laterally bounded in order to define individual photoconducting regions and to associate one of them with each group of emitters.

According to one advantageous variant, each photoconducting region is only associated with one emitter.

According to one advantageous variant, the upper conducting layers of the photoconductor have lateral dimensions in the range between the diameter and the height of each emitter in such a manner that variations in illumination of the photoconductor modify efficiently the configuration of the near electric field and hence the current emitted by the emitter as is explained hereinbelow.

According to one variant of the three preceding ones, the layer of photoconducting material can also be laterally bounded over the whole or over a part of its thickness.

Generally speaking, the modulation of the concentration of the carriers must follow the optical signal up to the maximum frequency targeted. The disappearance of the carriers in the photoconductors when they have injecting ohmic contacts (NIN, PIP, forward-biased PIN, etc.) occurs by recombination.

In order to limit the lifetime of the carriers, the following materials and configurations may notably advantageously be used:

Germanium or silicon or alloys of the two, with high concentrations of structural defects formed by irradiation with high-energy electrons ($10^{-10}$ s).
Silicon implanted with gold
"Low-temperature" GaAs (carrier lifetime: $10^{-12}$ s),
Other III-V or "low-temperature" III-V alloys,
Poly-, micro- or nanocrystalline semiconductors (carrier lifetime: $10^{-9}$ s to $10^{-10}$ s).
Geometries favoring surface recombination of the carriers (dimensions smaller than the diffusion length of the carriers).

Low-temperature III-V materials is understood to mean, as is known, materials whose growth is carried out at an unusually low temperature in such a manner that an excess of V element is produced within them which, by segregating, form particularly efficient recombination regions.

Another subject of the invention is an optically-controlled amplifier tube comprising an anode and a cathode, said cathode according to the invention comprising a field-emission electron emitter configured in series with a photoconductor According to one variant of the invention, the amplifier tube can advantageously comprise an intermediate grid, in addition to the anode and the cathode. According to another variant, the amplifier tube can, in addition to the cathode according to the invention, comprise a grid and a solenoid placed at the electron emission output after the grid. The role of the solenoid is to effect the transfer of energy from the electron packets emitted to the electromagnetic field wave which is created there, as is known in progressive-wave tubes

BRIEF DESCRIPTION OF THE DRAWINGS

The invention will be better understood and other advantages will become apparent upon reading the description that follows presented by way of nonlimiting examples and with reference to the appended figures, amongst which.

DESCRIPTION OF THE PREFERRED EMBODIMENTS

The following description is given in the advantageous case of an emitter associated with a current saturator device. However, the invention can very well be applied to variants in which several emitters are associated with the same saturator device.

Figure 1:
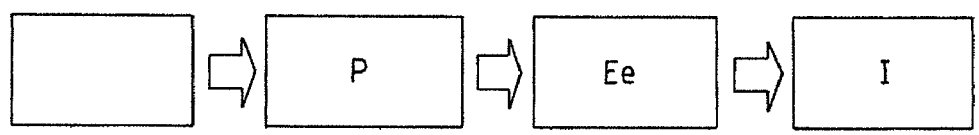
FIG. 1 shows schematically the principle of operation of an electron emitter according to the invention.

Generally speaking, the cathode of the invention operates according to the schematic diagram in FIG. 1:

Thanks to an optical source SO, a photoconducting element P receives radiation which allows its electrical conducting properties to be varied. Since this photoconducting element is connected in series with an electron-emitting element Ee, the photosensitive element allows the emitted current to be regulated by the cathode assembly when it is bathed in an electric field.

Figure 2:
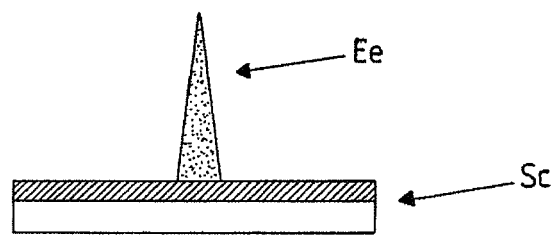
FIG. 2 shows schematically a field-effect cathode according to the prior art, comprising an emitter.

According to the invention, the cathode comprises at least one emitter element such as those described hereinafter:

These are conducting objects of micrometric and nanometric size, having a high ratio between the dimensions of their apex and their height. They owe their field emission properties to the amplification of the electric field existing at their apex because of their shape (example in FIG. 2). The emitters may be semiconductor or metallic micropoints for example made of molybdenum, of roughly conical or pyramidal shape, but may also be semiconductor or metal nanowires, nanofibers, carbon nanotubes, BN, or other known materials, etc.

Figures 3A, 3B, 3C:
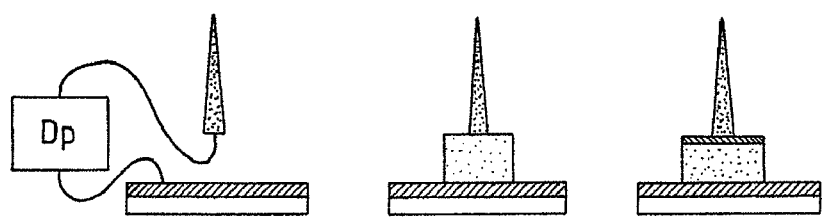
FIG. 3a shows schematically a cathode according to the invention comprising an emitter using field emission, placed near to a conducting substrate to which the emitter is electrically connected via a photoconducting element.
FIG. 3b shows schematically a configuration with vertical stacking of the same elements, with an electrical connection on the front face of the cathode.
FIG. 3c shows schematically a version in which the photoconducting device comprises a conducting layer on its upper face. The control of the lateral extension of this conducting layer is particularly important.

Thus, according to the invention, the emitter or group of emitters, such as have just been described, are connected in series to a photoconducting device Dp as illustrated in FIGS. 3a and 3b.

In the diagram in FIG. 3c, the photoconducting device having a conducting layer on its upper part can have lateral dimensions that are large in comparison with the dimensions of the emitter point. In this case, only the average field value E0 is modified when the photoconductor is illuminated, and it is modified at the most in a ratio. This situation is therefore not very favorable.

It can be particularly advantageous to use a photoconducting element with its upper conducting layer of dimensions similar to or less than the height of the emitter point.

Indeed, in this case, the configuration of field lines and the equipotential surfaces near the emitter is changed so that the electric field at the apex of the emitter is very substantially modified, as explained hereinbelow.

Figures 4A, 4B, 5A, 5B:
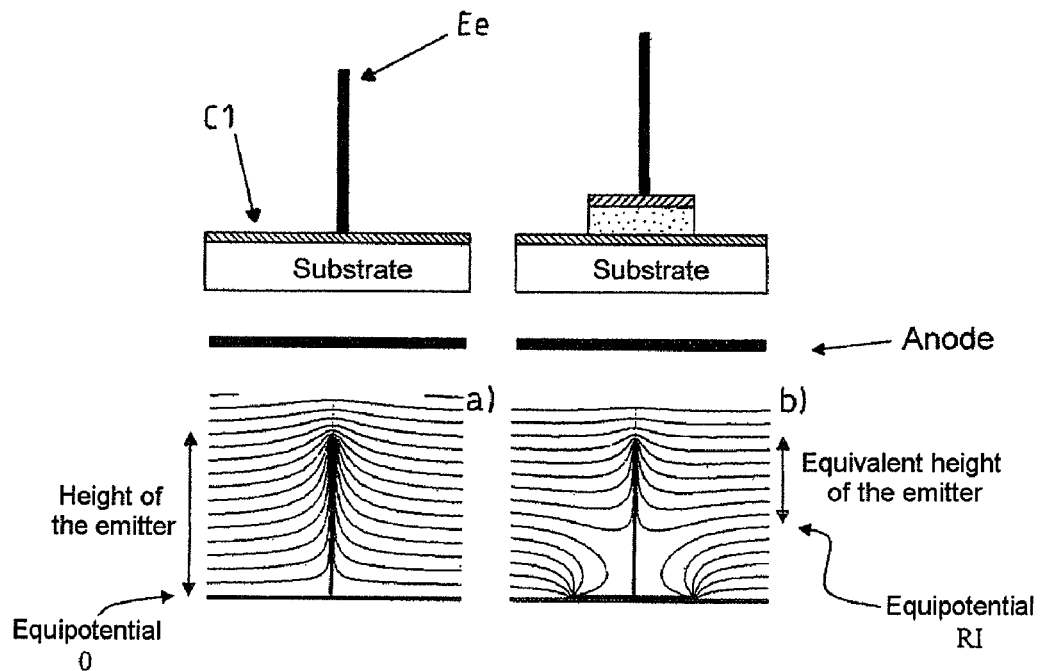
FIGS. 4a and 4b illustrate a cathode comprising an emitter on a substrate having a conducting surface of much greater dimensions than the height of the emitter, and the equipotential surfaces when the assembly is facing a positive anode.
FIG. 5a illustrates a cathode comprising an emitter on a resistor (having a conducting layer on its upper face) which in turn is on the conducting surface of a substrate, the resistor and its upper conducting layer having a surface area of about the size and height of the emitter.
FIG. 5b illustrates the equipotential surfaces when the assembly is facing a positive anode.

For a better understanding of these cases, the electric field amplification mechanism and the effect of a series resistor on the emission of an emitter should be examined. Reference can be made to FIGS. 4a and 4b, relating to a point on the surface of a conducting substrate and electric equipotential surfaces in the vicinity of this point. It is overhung by an electrode (grid or anode), not shown, being used to apply an average electric field $E_0 = V/d$.

At a distance from the emitter, the equipotentials are regularly spaced. Above the emitter, they are compressed, representing an amplification $\beta$ of the electric field $E = \beta^* E_0$, associated with the accumulation of charges at the apex. The amplification factor of the field is given by $$\beta \approx \frac{h}{r},$$

where h corresponds to the real height of the emitter, and r to its radius.

FIGS. 5a and 5b illustrate the case of a point on the surface of a localized conducting substrate of dimensions similar to that of the point. More precisely, FIG. 5a shows a portion of cathode with a single emitter in the presence of a separate series resistor, located under the emitter, and through which the emission current flows. The equipotential RI rises rapidly above the conducting substrate, moving laterally away from the emitter. If the lateral extension of the upper metallization of the resistor is small (lower than the height of the emitter), the shape of the equipotentials above the emitter is similar to that of a shorter emitter, as can be seen in FIG. 5b.

It can be shown that $$\beta \approx \frac{h}{r} \times \left(1 - \alpha \frac{RI}{hE_0}\right)$$

where $\alpha$ is a coefficient dependent on the lateral extension of the series resistor.

The situation is therefore as if the height of the nanotube h, the coefficient of amplification $\beta$ and the field at the apex $E = \beta E_0$ had undergone a relative variation $$\frac{dh}{h} = \frac{d\beta}{\beta} = \frac{dE}{E} = -\alpha \frac{RI}{hE_0},$$

compared with a situation without series resistor.

The emitted current which follows an essentially exponential law with the field E at the apex of the emitter:

$$I = aE^2 \exp -\frac{b}{E},$$

is very effectively decreased by the reduction in E.

For example, with $E_0 = 30 \text{ V/}\mu\text{m}$, a decrease in effective $\beta$ of $\beta = 230$ to $\beta = 200$ (d$\beta$/$\beta$=15%) causes a reduction in the emitted current I of one order of magnitude.

It can be pointed out that this effect is very significant for a limited lateral extension of the resistor: for a resistor diameter equal to the height of the emitter, then $\alpha = 0.88$. If the extension of the upper metallization of the resistor is much larger than the height of the emitter, the effect disappears, $\alpha \sim 0$. In this situation, it is no longer $\beta$ that is modified, but $E_0$, the average field. In this case, the relative variation of the field at the apex of the emitter is $$\frac{dE}{E} = \frac{dE_0}{E_0} = -\frac{RI}{E_0 d},$$

where d is the distance from the cathode to the upper electrode. The ratio of the dE/E between the two situations (smaller or larger extension of the upper metallization of the resistor) is then $$u = \alpha \frac{d}{h}.$$

It will be noted that the invention is particularly advantageous when d is greater than H (height of the emitters).

This is why, if it is desired to control the emitted current, it proves to be particularly advantageous to couple the point with a resistive element of small lateral extension.

In the present invention, the photoconducting element provides this function and, moreover, in a manner modulated by the illumination.

When the photoconducting element is a photoresistor, the modulation of illumination over time modulates the value of the resistance and thus the current emitted. This effect occurs as described hereinabove by means of the relative modulation of the effective height of the nanocylinders, the effective coefficient of amplification and the effective field at the apex, $$\frac{\Delta h}{h} = \frac{\Delta \beta}{\beta} = \frac{\Delta E}{E} \approx -\alpha \frac{\Delta(RI)}{hE_0}.$$

When the photoconductor works as a current source controlled by light, it is the object of a voltage drop $\Delta V$ which replaces RI in the above formula, and the result is the same:

$$\frac{\Delta h}{h} = \frac{\Delta \beta}{\beta} = \frac{\Delta E}{E} \approx -\alpha \frac{\Delta(\Delta V)}{hE_0}.$$

In this last case, the photoconductor then imposes its current on the emitter, allowing a control of the emitted current that is linear with the optical power.

Generally speaking, a photoconductor therefore offers a means of modulating with light the current emitted by the cathode.

Within the scope of the invention, the photoresistors and the PIN photodiodes can be substituted by gain devices, that are known, such as avalanche photodiodes or phototransistors.

Exemplary Embodiments of Cathodes According to the Invention

1) Examples of Cathode Using a Photoresistor in Mobility Mode

Figure 6A:
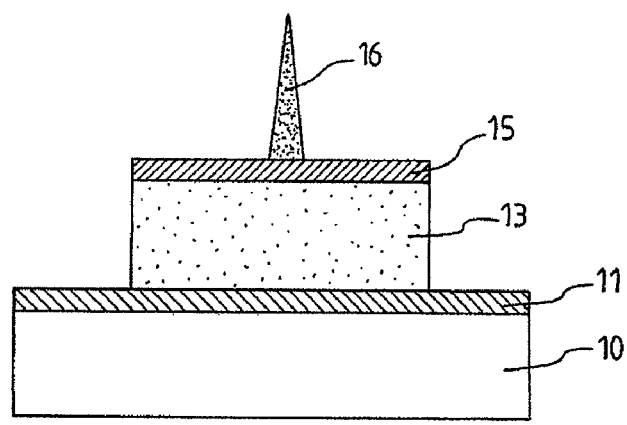
FIG. 6a illustrates a first variant of the invention whose photoconducting element (with its upper conducting layer) is mounted onto a transparent substrate whose surface is covered with a transparent conductor. This allows the cathode to be illuminated on its back face.

According to a first exemplary embodiment of the invention, a photosensitive resistor is used, and its illumination is modulated. Such a resistor is for example formed by the stacking of layers illustrated in FIG. 6a forming the following sequence: on the surface of a transparent substrate referenced 10: a transparent conductor 11/an intrinsic (I) or lightly doped (ν or π) semiconductor, referenced 13/a transparent conductor referenced 15, on which the emitter is formed in the shape of a point 16.

Figure 6B:
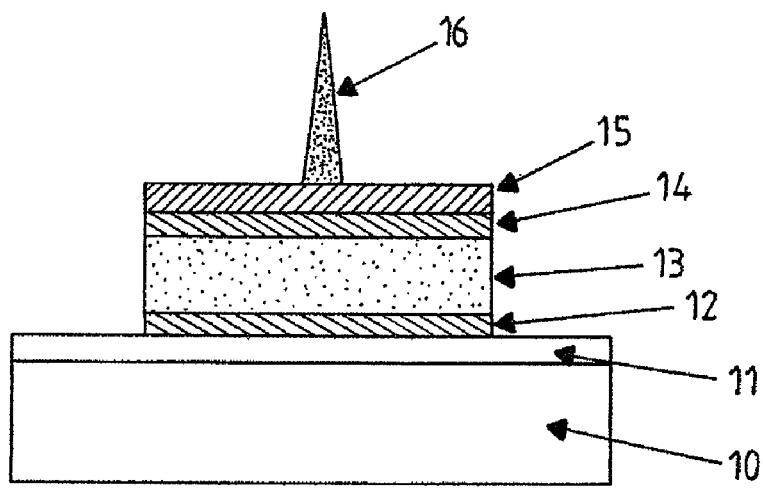
FIG. 6b illustrates, in an identical variant to that illustrated in FIG. 6a, the case where the photoconducting element contains an overdoped layer at each of its ends in order to operate in photoresistor mode.

Such a resistor can also be formed for example by the stacking of layers illustrated in FIG. 6b forming the following sequence: on the surface of a transparent substrate referenced 10: a transparent conductor 11/an n+-doped semiconductor, referenced 12/an intrinsic (I) or lightly doped semiconductor, referenced 13/an n+ semiconductor 14/a transparent conductor referenced 15, on which the emitter is formed in the shape of a point 16.

For example, under the emitter and starting from the latter, the sequence can be TiN/phosphorus-doped silicon $10^{19}$ $cm^{-3}$/unintentionally-doped silicon/phosphorus-doped silicon $10^{19}$ $cm^{-3}$/ITO on a quartz substrate precoated with conducting surfaces.

The whole assembly is subjected on the rear or front face to radiation in a spectrum of wavelengths at which silicon is absorbing, typically at wavelengths of around 0.5 μm. All the layers are, in this example, laterally bounded (diameters or sides advantageously smaller than the height of the emitter point). This assembly forms the cathode.

Figure 7:
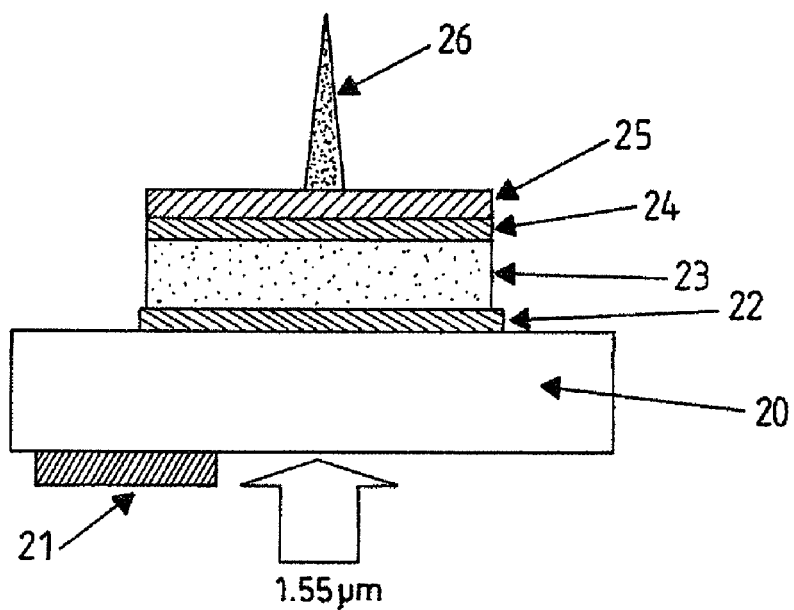
FIG. 7 illustrates a second variant of the invention in which the substrate is itself transparent and conducting, for example a highly doped semiconductor, and provided with a contact electrode on its lower face.

According to a second exemplary embodiment illustrated in FIG. 7, the semiconductor I or ν is photoconducting and has a resistance that is variable according to the illumination by an optical source of wavelength λ (μm)<1.24/Eg (eV), where Eg is the band gap of the semiconductor. It can have a thickness of a few hundreds of nm to a few μm. The n+ semiconductors provide an ohmic contact between the intrinsic semiconductor and the conducting layers. Their thickness can be from a few tens of nm to a few hundreds of nm. The substrate is itself made of doped semiconductor and the electrical connection with the photoconducting device is also made by means of it. The optical wave with time-dependent power passes through the transparent substrate and the transparent conductor and is absorbed by the I or ν semiconductor, in which it modulates the concentration of the charge carriers, and hence its resistance, and consequently the emitted current For such a configuration, the couple InP/GaInAs is particularly well adapted to an excitation at 1.55 μm.

More precisely, on a substrate 20 of the n-doped InP type that is transparent to the excitation wavelength, in this case to 1.55 microns, a first conducting contact is formed on the face denoted as rear face 21.

On the face referred to as the front face, on the emitter side, the photoresistor is formed by epitaxy comprising a layer 22 of n-doped $Ga_{0.48}In_{0.52}As$, covered with a layer 23 of intrinsic, or very lightly doped, $Ga_{0.48}In_{0.52}As$ itself covered with a layer 24 of p-doped $Ga_{0.48}In_{0.52}As$, the whole stack being covered with a second metallic layer 25 on which is located the field-effect emitter or micropoint 26. The doped layers are thin (a few tens of nm) particularly the bottom one, so as not to absorb uselessly the optical power that must modulate the resistance of the I region. This layer can have a typical thickness of a few hundreds of nm to a few μm.

This photoresistor is a forward-biased diode, in contact on its lower side with a reference potential V-, its upper contact being at a higher potential V+, by the application of a higher voltage to the electrode facing the cathode in such a manner that electrons and holes can be injected into the region of intrinsic or lightly doped material. Thus, it is not the contacts that dominate the impedance of the diode, but the resistance of the I region which can be modulated by light.

In the same way as for this example in FIG. 7, a photoresistor with an NIN structure, instead of forward-biased PIN, could be formed.

2) Example of Cathode Using a Photoresistor in Carrier Speed Saturation Mode

When the thickness of the layer of intrinsic material, which is the seat of the carrier modulation, is sufficiently large with respect to the voltage to which it is subjected, the resistance of this layer can be adjusted. This is no longer the case when the photosensitive material is subjected to a field higher than a few $10^3$ to $10^4$ V/cm; it no longer operates in mobility mode, but in carrier speed saturation mode. In this case, it is no longer the resistance that is modulated, but it operates in illumination-controlled current source mode. The emitted current adjusts itself to the value of the current source which plays the role of setpoint. This situation can be advantageous compared to the previous one.

Thus, the resistor connected in series with the current emitter can typically be a forward-biased PIN diode or an NIN sequence, composed of a stack of semiconductor layers with an intermediate layer, in which charge carriers can be photo-generated allowing its resistance to be varied.

According to the prior art, the device typically operates in electron carrier mobility mode as long as the assembly is not subjected to too high a voltage.

Figure 8:
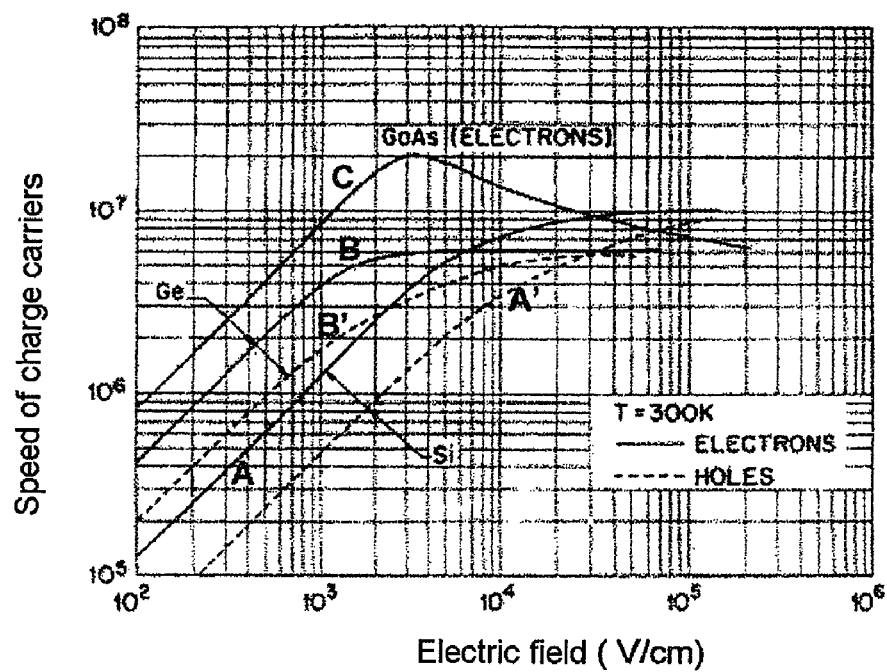
FIG. 8 illustrates the variation of the speed of the charge carriers as a function of the applied electric field in various semiconductor materials.

FIG. 8 illustrates such a behavior showing the charge carrier speed (solid lines relate to electrons and dashed lines relate to holes) as a function of the applied voltage and for different materials. A first mode can be seen on these curves, in which the carrier speed varies continuously, then beyond a certain value of field, this speed reaches a plateau and the corresponding current reaches a current referred to as the saturation current ($I=I_{sat}=SJ_{sat}$ with S being the surface area).

This phenomenon is notably described in the publications by C. Jacoboni, C. Canali, G. Ottaviani, and A. A. Quaranta, "A review of some charge transport properties of silicon", Solid State Electron., 20, 77 (1977) and by P. Smith, M. Inoue, and J. Frey, "Electron velocity in Si and GaAs at very high electric fields", Appl. Phys. Lett., 37, 797 (1980).

Indeed, the current density is given by J=nev where n is the carrier concentration, e the electronic charge and v the carrier speed. For weak electric fields, the carrier speed is proportional to the field, expressed as v=μE, where E is the electric field and μ the mobility. The device is in mobility mode (Ohm's law). For higher electric fields, a saturation of the carrier speed is observed and, in this case, $J=J_{sat}=nev_{sat}$. Thus, the current density no longer depends on the applied field, and the emitted current varies linearly with the illumination of the structure.

For silicon, it can be seen in FIG. 8 that, for fields higher than $10^4 V.cm^{-1}$, the operation goes into this saturation mode.

3) Examples of Cathode Using a Reverse-biased PIN or MIN Photodiode

Figure 9:
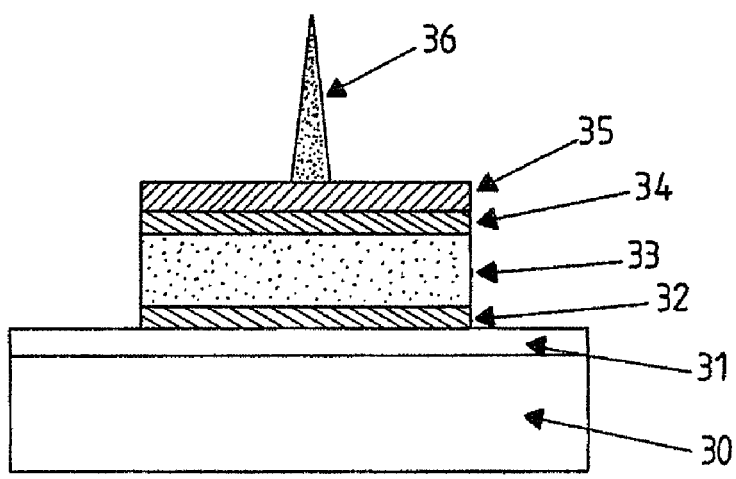
FIG. 9 illustrates a third variant of the invention comprising a first reverse-biased photodiode structure configured in series with the emitter.

Instead of the photoconductor hereinabove a reverse-biased PIN photodiode may also be used (FIG. 9). For this purpose, only the order of the layers changes.

The lower contact layer 31 (formed on the surface of a transparent substrate 30) is at a potential V−, not shown, whereas the upper contact layer 35 is at a potential V+, not shown, on either side of diode-type structure, and the stacking of the layers 32/33/34 is as illustrated in FIG. 9.

In this case, a current emitted by the point 36 may be envisioned of 1 A emitted/W of optical power, or thereabouts, for semiconductors whose gap is close to 1 eV (silicon, GaAs, GaInAs . . . ). The formation is in every way similar to the cathodes using photoresistors. It suffices to replace the lower n+-doped layer with a p+-doped one (PIN structure).

Figure 10:
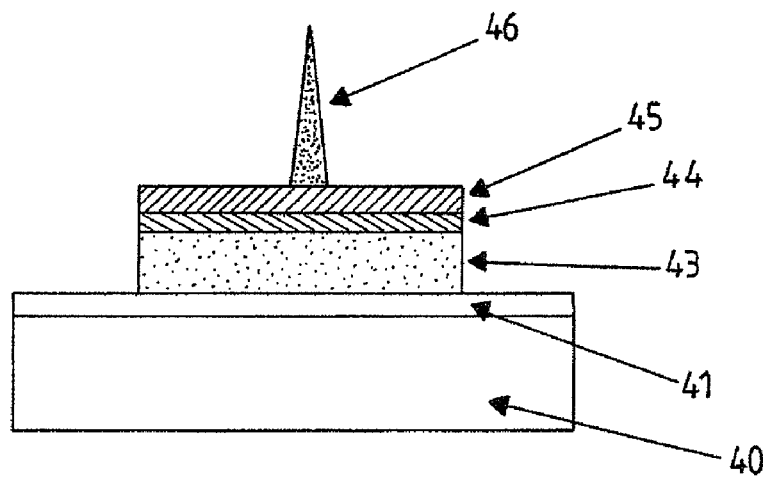
FIG. 10 illustrates a fourth variant of the invention comprising a second reverse-biased photodiode structure configured in series with the emitter.

It is also possible to form a structure of MIN type as illustrated in FIG. 10, in which the layer M is illustrated by the layer 41 which is a conducting layer (metals or transparent conductor such as indium oxide, tin oxide, etc.).

According to this configuration, in the absence of illumination, no current flows. In the presence of illumination, a maximum of one electron transits per incident photon: this is not a gain structure as the photoresistor can be.

Figure 11:
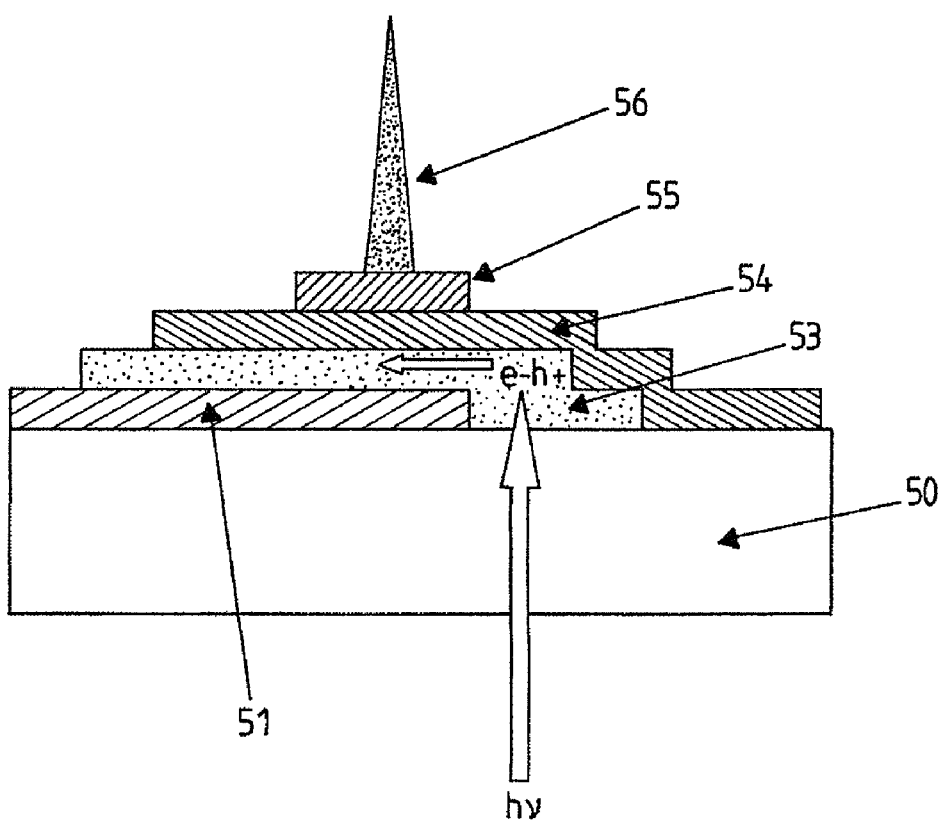
FIG. 11 illustrates a fifth variant of the invention comprising a third reverse-biased photodiode structure configured in series with the emitter.

One variant of MIN structure is illustrated in FIG. 11, in which the photogenerated carriers diffuse laterally within the layer 53 of intrinsic or lightly doped material. According to this configuration, it is possible to eliminate the transparent conducting layer by replacing it with a contact 51, so that this variant now only has the stack of two semiconductor layers (layer 53 and layer 54), on which, in a conventional manner, an upper contact layer 55 and the emitter point 56 are formed.

Figure 12:
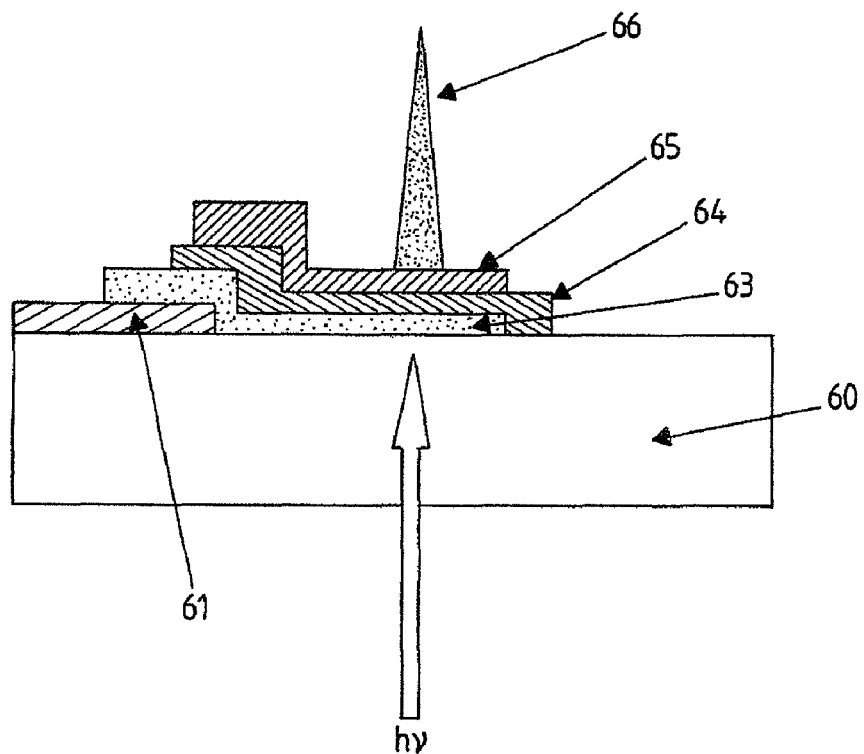
FIG. 12 illustrates a sixth variant of the invention comprising a fourth reverse-biased photodiode structure configured in series with the emitter.

The structure of MIN type hereinabove may be improved by displacing the layer 61, as illustrated in FIG. 12, in order to allow a better control of the carriers within the I layer, illustrated by the layer referenced 63, on top of which are the layers 64 and 65, under the point 66.

These reverse-biased PIN or MIN structures offer the advantage of avoiding the purely electrical injection of a carrier space charge from the electrodes which may occur in certain cases in photoresistors.

They offer another advantage: the use of means for limiting the lifetime of the carriers can be avoided (the disappearance of the carriers can happen by transit toward the electrodes). The drawback is the absence of photoconduction gain (control optical power could be higher).

Figure 13:
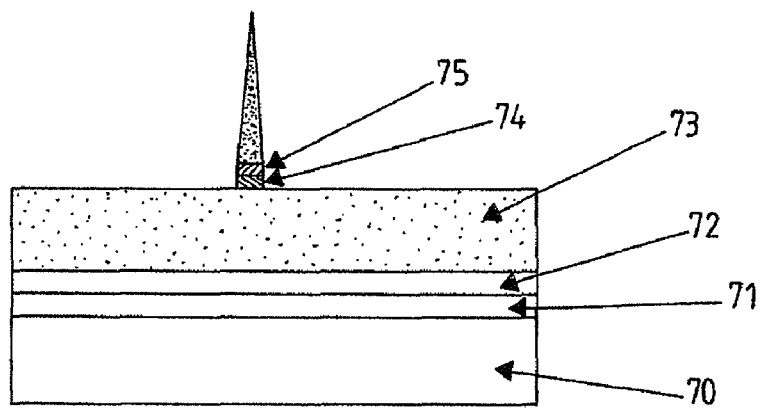
FIG. 13 illustrates a seventh variant of the invention comprising a photoresistor configured in series with an emitter comprising a contact element located on the emitter itself.

The upper conducting layer of the photoconducting element (overdoped and or metallic layer), as is illustrated in FIG. 13, can advantageously be very thin, referenced 75, with a highly doped lower layer 74 (lateral dimensions of the order of a hundred nm) which allows high dark impedances, useful for operation at high frequency, to be obtained, without limiting the dimensions of the underlying layers. These very localized layers are deposited on the surface of the layer of undoped, or very lightly doped, material 73.

The semiconductor layers N, I and P may also be laterally bounded, over their entire thickness or only over a part.

Figure 14:
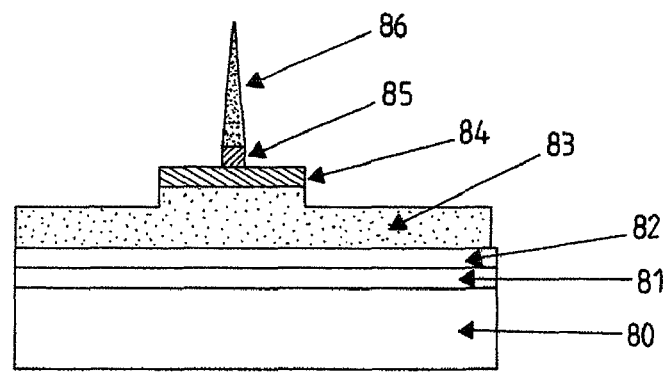
FIG. 14 illustrates a variant of the invention comprising a mesa structure on the photoresistor configured in series with the emitter.

A particularly advantageous situation is that in FIG. 14 where the upper n+ layer 84 is cut out over its entire thickness and the photosensitive I layer 83 is bounded over only a part of its thickness. In this variant, the upper contact layer is very localized 85 and supports the emitter point 86.

The purpose of the narrow part of the I layer is to form a high impedance in the absence of illumination, and the wider, or even unbounded, part of this same I layer has reasonably large dimensions, compatible under illumination with a good coupling of the light, hence a high absorption, and therefore an efficient creation of carriers. The photogenerated carriers quickly diffuse into the upper narrow part of the I layer to provide conduction in this region.

The photosensitive semiconductor can be disposed in a vertical configuration with its upper and lower contacts, or in a planar arrangement, characterized in that these two contacts have no point on the same perpendicular to the substrate. This configuration can facilitate the illumination of the photosensitive semiconductor and avoid the need to resort to transparent conductors that have a lower conductivity.

The photosensitive semiconductor can be portions of the substrate itself, if this is a semiconductor.

Hereinafter, various means of coupling light with the photosensitive element will be described:

The photosensitive elements can be portions of the substrate itself or layers of materials deposited onto the substrate, on the same side as the emitters or on the other side.

The photosensitive elements may be illuminated directly or through the substrate if this is transparent to the exciting wavelength.

The light can be channeled by guided propagation in fibers, or in guides integrated into the substrate, or via spatial propagation, in uniform illumination mode or focused onto the photosensitive elements themselves, by means of microlens arrays for example, which can be integrated into the rest of the structure. Lastly, antireflective layers can be used, at the input of the light into the structure, together with Bragg reflectors in order to maximize the interaction of the light with the photoconducting layer.

All the variants of cathode according to the invention that have been described may be incorporated into amplifier tubes.

Figure 15:
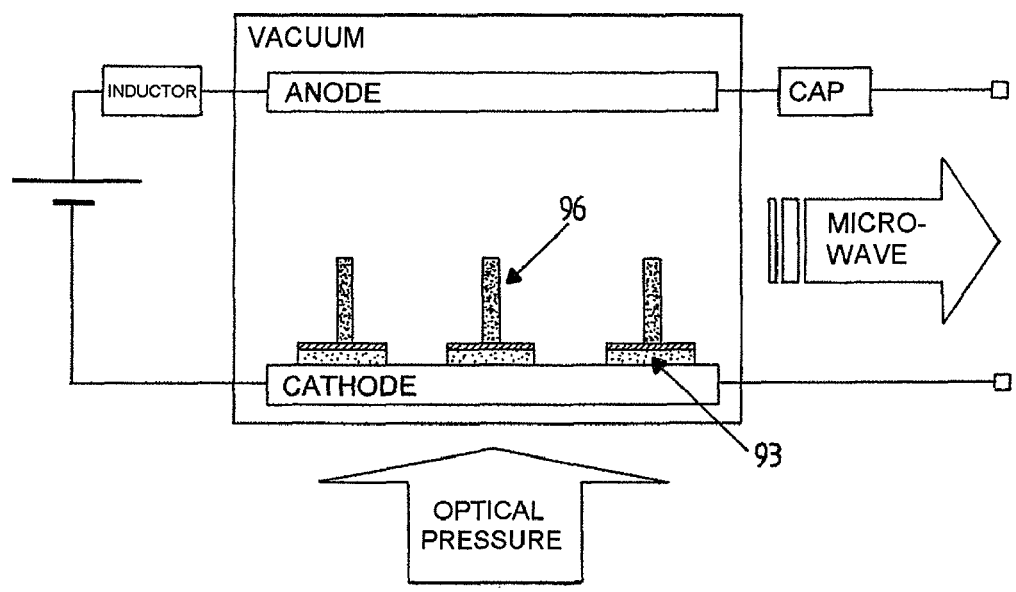
FIG. 15 illustrates a first example of amplifier tube using an emitter according to the invention.

FIG. 15 illustrates a first example of a possible configuration of an amplifier tube comprising a cathode according to the invention, comprising emitter points 96 coupled to photoconducting elements 93.

The operation is as follows. The optical wave that carries the input signal modulates the emitted current as described hereinabove. The electron packets accelerated by the DC field excite a microwave electric field within the cavity. The microwave power comes from the power supplied by the DC generator which also serves as a bias supply for the emission of the electrons.

The operation of the amplifier device may also be seen as that of an oscillator whose oscillation amplitude is controlled by a photosensitive device controlled by light. This type of amplifier is completely novel.

Figure 16:
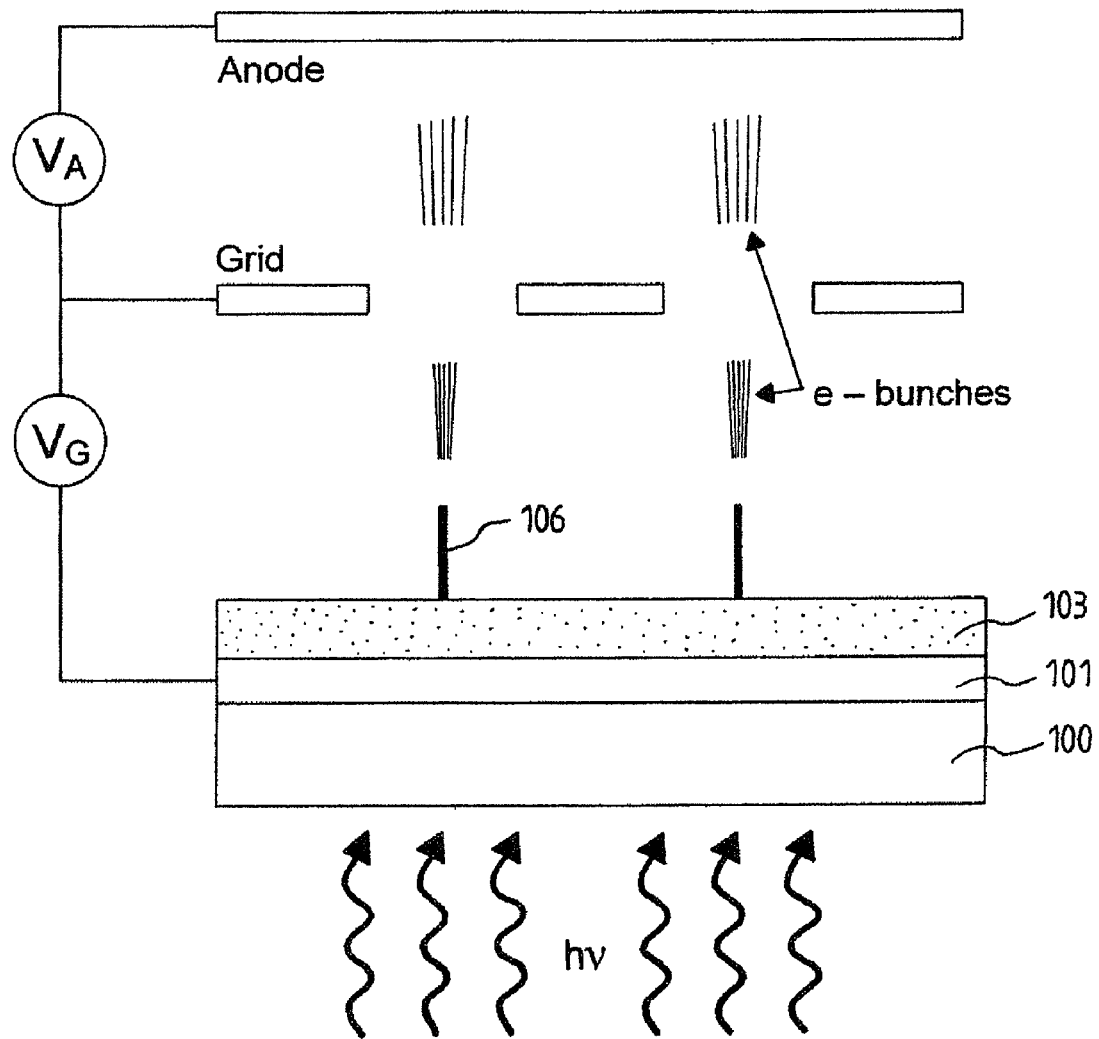
FIG. 16 illustrates a second example of amplifier tube using an emitter according to the invention.

FIG. 16 illustrates a second example of a possible configuration comprising an intermediate grid. This device is similar to that illustrated in FIG. 15 comprising, in addition, an intermediate grid, in order to allow independent control of the DC biasing of the emission and of the DC biasing of the amplification and isolation of the cathode-grid and grid-anode cavities and thus prevent oscillation. Here, the microwave field is weak within the cathode-grid cavity hence does not substantially modify the field $E_0$ to which the emitter 106 is subjected that is coupled to a photoconducting element 103 on the surface of a substrate 100 covered with a transparent conducting layer 101, and hence there are no oscillations in this cathode-grid cavity. The amplification occurs in the conventional manner within the grid-anode cavity, as in an electrically controlled triode.

This tube can offer the advantage of being relatively wideband, not necessarily requiring a cavity.

Figure 17:
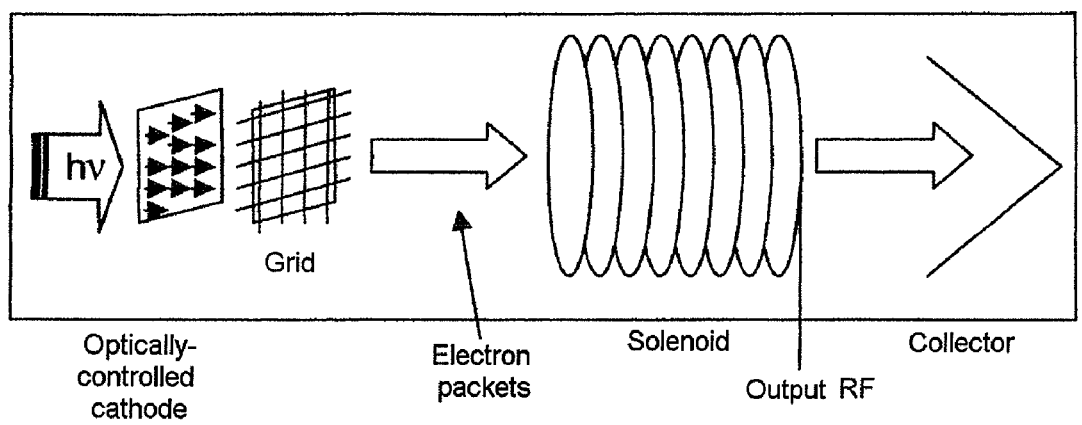
FIG. 17 illustrates an amplifier structure with optical control according to the invention.

FIG. 17 illustrates a third example of an amplifier tube with a solenoid.

It comprises an optically-controlled cathode, of one of the types described hereinabove, associated with a grid. The emission of the electrons is modulated by this assembly. The electron packets are then accelerated and transfer their energy to the microwave field which is created within the solenoid. This transfer is wideband. Thanks to the optical control, the modulation of the emission is also wideband, not requiring a cavity. This device additionally offers the advantage that, thanks to the nonlinear nature of the emission by field emission, the emitted electrons can be grouped into packets that are relatively monokinetic, a fact which favors the recovery of energy in the collector.

Generally speaking, the present invention offers the following advantages:

The parallelism of the optical control allows all the emitters to be driven in phase, thus allowing higher transconductances for the amplifiers that use these cathodes.

The galvanic isolation inherent in the optical control obviates the need for insulators and allows high-frequency performance to be conserved.

The elimination of the electrical input guides simplifies the connection components and allows enhanced miniaturization notably for triodes.

The elimination of the grid in certain configurations of amplifier tubes leads to a simplification of fabrication and to the elimination of the problems of grid rigidity and grid transparency.

Optical control is compatible with remote control.

In certain types of tubes, the possibility of an optical 'gate' on an electrically-controlled device can lead to design simplification. Lastly, generally speaking, the invention allows compact and wideband tubes.

The invention claimed is:

1. An optically-controlled field-emission cathode, comprising:
   a substrate having at least one conducting surface;
   at least one conducting emitter element; and
   a photoconducting element electrically connected in series between each conducting emitter element and a conducting surface of the substrate;
   wherein the photoconducting element has an upper face and a conducting layer disposed thereon, the conducting layer disposed between the upper face and the emitter element; and
   wherein the conducting layer at the upper face of the photoconducting element is of a dimension similar or less than a height of the emitter.

2. The optically-controlled field-emission cathode as claimed in claim 1, wherein each emitter, photoconducting element, and conducting surface of the substrate are layered in this order within an integrated structure on the substrate.

3. The optically-controlled field-emission cathode as claimed in claim 1, wherein each emitter is made of metal and is of substantially conical or pyramidal shape with a base smaller than or equal to the height.

4. The optically-controlled field-emission cathode as claimed in claim 1, wherein each emitter is made of carbon or metal and is of nanowire or nanofiber or nanotube type with a height greater than the diameter.

5. The optically-controlled field-emission cathode as claimed in claim 1, wherein each conducting layer on the upper face of the photoconducting elements is divided up into regions that are isolated from one another, each region associated with an emitter, and the lateral dimensions of each region are smaller than, or of a similar size to, the height of the emitter.

6. The optically-controlled field-emission cathode as claimed in claim 1, wherein the photoconducting element is a photoresistor operable as a source of current directly supplied to the emitter element.

7. The optically-controlled field-emission cathode as claimed in claim 1, wherein the photoconducting element is a photodiode of PIN type, P being representative of a layer of p+-doped semiconductor material, I being representative of a layer of undoped, or very lightly doped semiconductor material, and N being representative of a layer of n+-doped semiconductor material, or of MIN type, M being representative of a layer with metallic conduction, the layers P or M being in electrical contact with a conducting surface of the substrate in such a manner that the photodiode is reverse-biased during normal operation of the cathode.

8. The optically-controlled field-emission cathode as claimed in claim 1, wherein the photoconducting element comprises semiconductor material of the silicon type, or of III-V material type based on GaAs, InP or on alloys thereof.

9. An optically-controlled amplifier tube comprising a generator, an anode, and a cathode as claimed in claim 1.

10. The optically-controlled amplifier tube as claimed in claim 9, comprising an intermediate grid connected to the anode and to the cathode.

11. The optically-controlled amplifier tube as claimed in claim 9, comprising a solenoid placed between the cathode and the anode.

12. The optically-controlled field-emission cathode as claimed in claim 2, wherein the emitters are of substantially conical or pyramidal shape with a base smaller than or equal to the height, and are made of metal.

13. The optically-controlled field-emission cathode as claimed in claim 2, wherein the emitters are of nanowire or nanofiber or nanotube type with a height greater than a diameter thereof, and are made of carbon or metal.

14. The optically-controlled field-emission cathode as claimed in claim 2, wherein the photoconducting element is a photodiode of PIN type, P being a layer of p+-doped semiconductor material, I being a layer of undoped, or very lightly doped semiconductor material, and N being a layer of n+-doped semiconductor material, or of MIN type, M being a layer with metallic conduction, the layers P or M in electrical contact with a conducting surface of the substrate whereby the photodiode is reverse-biased during operation of the cathode.

15. The optically-controlled field-emission cathode as claimed in claim 3, wherein the photoconducting element is a photodiode of PIN type, P being a layer of p+-doped semiconductor material, I being a layer of undoped, or very lightly doped semiconductor material, and N being a layer of n+-doped semiconductor material, or of MIN type, M being a layer with metallic conduction, the layers P or M in electrical contact with a conducting surface of the substrate whereby the photodiode is reverse-biased during operation of the cathode.

16. The optically-controlled field-emission cathode as claimed in claim 4, wherein the photoconducting element is a photodiode of PIN type, P being a layer of p+-doped semiconductor material, I being a layer of undoped, or very lightly doped semiconductor material, and N being a layer of n+-doped semiconductor material, or of MIN type, M being a layer with metallic conduction, the layers P or M in electrical contact with a conducting surface of the substrate whereby the photodiode is reverse-biased during operation of the cathode.

17. The optically-controlled field-emission cathode as claimed in claim 2, wherein the photoconducting element comprises semiconductor material of the silicon type or of III-V material type based on GaAs, InP or on alloys thereof.

18. The optically-controlled field-emission cathode as claimed in claim 3, wherein the photoconducting element comprises semiconductor material of the silicon type or of III-V material type based on GaAs, InP or on alloys thereof.

19. The optically-controlled amplifier tube as claimed in claim 10, comprising a solenoid placed between the cathode and the anode.

20. The optically-controlled field-emission cathode as claimed in claim 1, wherein the photoconducting element comprises low temperature type III-V semiconductor material.

21. The optically-controlled field-emission cathode as claimed in claim 1, wherein the photoconducting element comprises semiconductor material of low temperature GaAs.

22. The optically-controlled field-emission cathode as claimed in claim 2, wherein the photoconducting element comprises semiconductor material of low temperature GaAs.

23. The optically-controlled field-emission cathode as claimed in claim 2, wherein the photoconducting element comprises low temperature type III-V semiconductor material.

* * * * *